[12] United States Patent
Sugitatsu et al.

(10) Patent No.: US 7,175,691 B2
(45) Date of Patent: Feb. 13, 2007

(54) METHOD OF PRODUCING STAINLESS STEEL BY RE-USING WASTE MATERIAL OF STAINLESS STEEL PRODUCING PROCESS

(75) Inventors: Hiroshi Sugitatsu, Kobe (JP); Itsuo Miyahara, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 241 days.

(21) Appl. No.: 10/438,013

(22) Filed: May 15, 2003

(65) Prior Publication Data
US 2003/0233912 A1 Dec. 25, 2003

(30) Foreign Application Priority Data
Jun. 18, 2002 (JP) ............... 2002-177005

(51) Int. Cl.
C21C 7/04 (2006.01)
C22B 7/02 (2006.01)
(52) U.S. Cl. .................................. 75/560; 75/324
(58) Field of Classification Search ............... 75/507, 75/466, 958, 560, 414; 226/160; 60/39.12
See application file for complete search history.

(56) References Cited

U.S. PATENT DOCUMENTS

| 4,416,688 A | * | 11/1983 | Greenwalt | 75/359 |
| 4,673,431 A | | 6/1987 | Bricmont | |
| 5,567,224 A | * | 10/1996 | Kundrat | 75/414 |
| 5,885,521 A | | 3/1999 | Meissner et al. | 266/79 |
| 5,989,019 A | | 11/1999 | Nishimura et al. | 432/138 |
| 6,063,156 A | | 5/2000 | Negami et al. | 75/501 |
| 6,129,777 A | | 10/2000 | Fuji et al. | 75/484 |
| 6,149,709 A | | 11/2000 | Uragami et al. | 75/504 |
| 6,152,983 A | | 11/2000 | Kamijo et al. | 75/484 |

(Continued)

FOREIGN PATENT DOCUMENTS

EP  0 275 863  7/1988

(Continued)

OTHER PUBLICATIONS

J. K. Pargeter, et al., Conservation & Recycling, vol. 8, No. 3/4, XP-002254917, pp. 363-375, "Operating Experience at Inmetco and Application of the Process to the Production of DRI", 1985.

(Continued)

*Primary Examiner*—Roy King
*Assistant Examiner*—Kathleen McNelis
(74) *Attorney, Agent, or Firm*—Oblon, Spivak, McClelland, Maier & Neustadt, P.C.

(57) ABSTRACT

A method of producing stainless steel includes the steps of melting a raw material in an electric furnace to form molten steel, and then refining the molten steel by a refining furnace to produce stainless steel in a stainless steel producing process. In the method, a carbonaceous reducing agent is added to a zinc-containing waste material produced in the stainless steel producing process, the resultant mixture is agglomerated by a briquette press to form agglomerates incorporated with a carbonaceous material, the agglomerates incorporated with the carbonaceous material are heated in a rotary hearth furnace to reduce and evaporate zinc to form dezincified agglomerates, and then the dezincified agglomerates are charged as a coolant in an oxidation period of the refining furnace.

10 Claims, 1 Drawing Sheet

U.S. PATENT DOCUMENTS

| | | | |
|---|---|---|---|
| 6,238,453 B1 * | 5/2001 | Rose et al. .................. | 75/10.63 |
| 6,241,803 B1 | 6/2001 | Fuji ............................ | 75/425 |
| 6,251,161 B1 | 6/2001 | Tateishi et al. ............... | 75/484 |
| 6,254,665 B1 | 7/2001 | Matsushita et al. ........... | 75/484 |
| 6,258,149 B1 | 7/2001 | Sugiyama et al. ............ | 75/484 |
| 6,296,479 B1 | 10/2001 | Nishimura et al. ......... | 432/138 |
| 6,302,938 B1 | 10/2001 | Kamijo et al. ................ | 75/316 |
| 6,319,302 B1 | 11/2001 | Harada ......................... | 75/484 |
| 6,334,883 B1 | 1/2002 | Takenaka et al. ............. | 75/319 |
| 6,368,379 B1 | 4/2002 | Tateishi et al. ............... | 75/484 |
| 6,413,295 B2 | 7/2002 | Meissner et al. ............. | 75/484 |
| 6,500,381 B1 | 12/2002 | Harada ......................... | 266/44 |
| 6,503,289 B2 | 1/2003 | Tanigaki et al. ............ | 75/10.63 |
| 6,511,316 B2 | 1/2003 | Harada et al. ............ | 432/138 |
| 6,517,770 B1 | 2/2003 | Tateishi et al. ............... | 266/46 |
| 6,521,171 B2 | 2/2003 | Tateishi et al. ............... | 266/46 |
| 6,569,223 B2 | 5/2003 | Tanigaki et al. ............. | 75/484 |

FOREIGN PATENT DOCUMENTS

| | | |
|---|---|---|
| JP | 56-93834 | 7/1981 |
| JP | 9-209047 | 8/1997 |

OTHER PUBLICATIONS

K. Grebe, et al., Stahl U. Eisen, Metallurgie, vol. 110, No. 7, XP-000161339, pp. 99-106, and 203, "The Metallurgy of Direct Reduction of Metallurgical Wastes According to the Inmetco Process", Jul. 13, 1990 (with partial English translation), read partial translation only.

K.-H. Bauer, et al., Stahl U. Eisen, Metallurgie, vol. 110, No. 7, XP-000161338, pp. 89-96, and 202, "Recycling of Metallurgical Wastes According to the Inmetco Direct Reduction Process", Jul. 13, 1990 (with partial English translation), read partial translation only.

J. K. Pargeter, et al., 44$^{th}$ Electric Arc Furnace Conf., XP-002254918, pp. 403-408, "Recycling of Waste and Flue Dust from the Steel Industry into Hot Metal, Using the Inmetco Process", 1986.

R. H. Hanewald, et al., Iron and Steel Engineer, vol. 62, No. 3, XP-002106296, pp. 62-67, "Recovery of Metals from Steel Wastes and Production of DRI by the Inmetco Process", Mar. 1985.

S. Barozzi, et al., Steel Times, Fuel & Metallurgical Journals, vol. 225, No. 5, XP-000692297, pp. 191-192, "Metal Recovery from Steel Wastes by the Inmetco Process", May 1, 1997.

J. L. Roth, et al., La Revue de Metallurgie-CIT, vol. 98, No. 11, XP-001101771, pp. 987-996, "Primus, A New Process for Recycling By-Products and Producing Virgin Iron", Nov. 2001.

T. Hansmann, et al., Stahl U. Eisen, Metallurgie, Recycling, vol. 120, No. 11, XP-000977725, pp. 49-53, "Primus-Ein Neues Verfahren Für Das Recycling Von Hüttenwerksreststoffen und die Eisenerzreduktion", Nov. 15, 2000.

R. Deike, et al., Stahl U. Eisen, Metallurgie, vol. 119, No. 2, XP-000802518, pp. 53-58, and 121, "Behaviour of Zinc During the Recycling of Iron-Containing Dusts and Sludges", Feb. 16, 1999 (with partial English translation).

J. A. Philipp, et al., Stahl U. Eisen, Umweltschutz and Ergonomie, vol. 112, No. 12, XP-002254916, pp. 75-86, "Recycling In Der Stahlindustrie", Dec. 14, 1992.

* cited by examiner

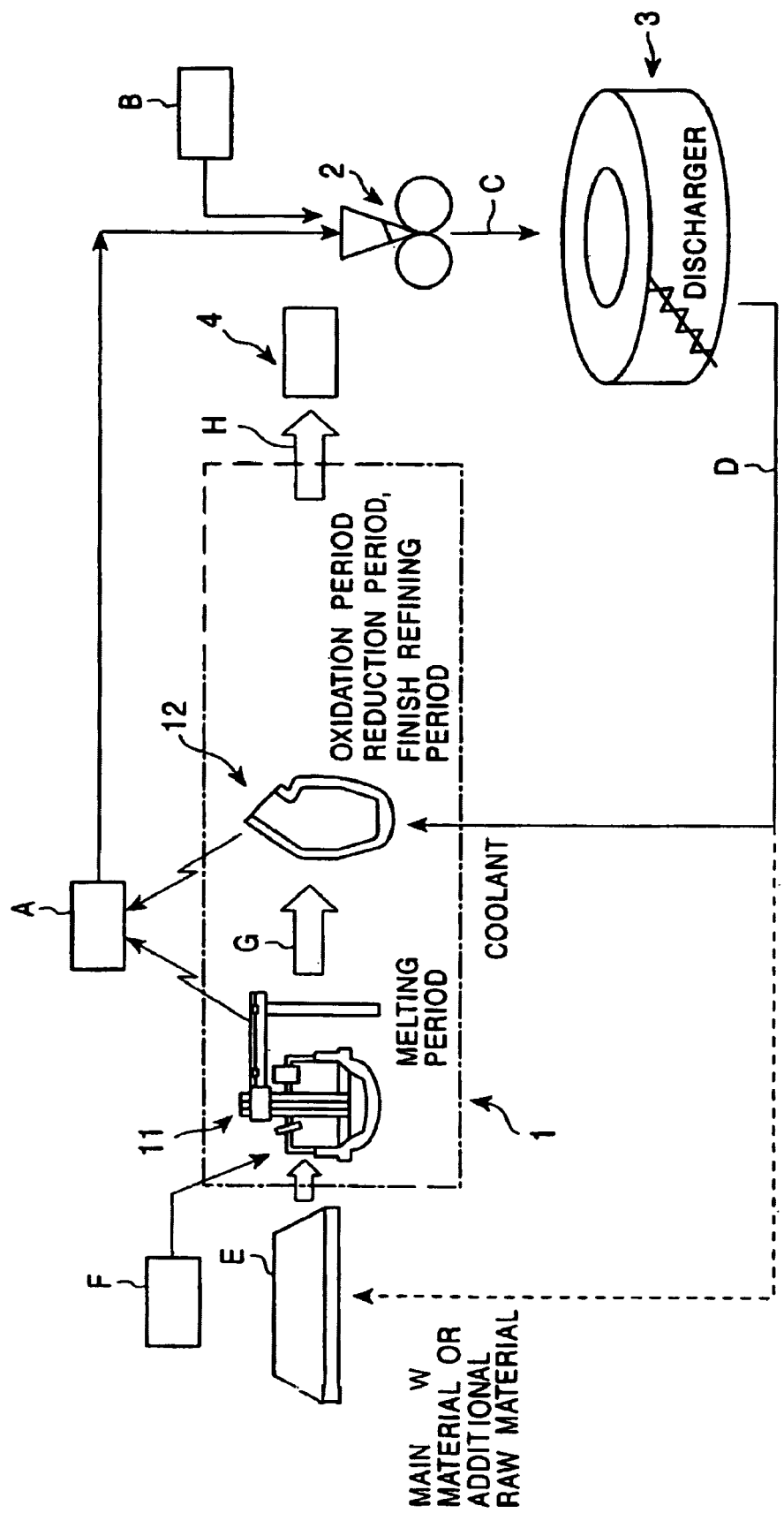

METHOD OF PRODUCING STAINLESS STEEL BY RE-USING WASTE MATERIAL OF STAINLESS STEEL PRODUCING PROCESS

BACKGROUND OF THE INVENTION

1. Field of the Invention

The present invention relates to a method of producing stainless steel by re-using waste materials such as dust and scales produced in a stainless steel producing process.

2. Description of the Related Art

Stainless steel is generally produced by melting scraps, and raw materials such as Fe—Cr, Fe—Ni, and Ni metal in an electric furnace, and then refining molten steel by a refining furnace (stainless steel producing process). Conventionally, the electric furnace corresponds to a melting period in which raw materials are melted, but an oxidation period (referred to as a "pre-decarbonization period") in which molten steel is decarbonized by oxygen blowing may be further provided. The refining furnace corresponds to the oxidation period in which molten steel is decarbonized by oxygen blowing, a reduction period in which Cr oxidized in the oxidation period and transferred into slag is re-reduced to a metal which is recovered to the molten steel, and a finish refining period in which the molten steel is deoxidized, and the steel components and temperature are controlled. The exhaust gas discharged from the electric furnace and refining furnace (VOD, RH, AOD, MRP, etc.) contains dust. Since the dust contains components such as Fe, Ni, Cr, and the like, the dust is preferably re-used as a raw material. Moreover, the dust contains $Cr^{6+}$, and thus a great cost is required for disposing the dust. Therefore, from an economical viewpoint, it is desirable to recycle the dust. However, the dust contains Zn mainly derived from scraps, and thus when the dust is returned to the electric furnace and refining furnace without any treatment, Zn is reduced and evaporated, and scattered in the exhaust gas, thereby concentrating Zn in the dust. The dust containing concentrated Zn adheres to the inner surfaces of a throat and exhaust gas piping to cause the problem of coating the inner surfaces. In addition, oxidation and reduction of Zn are repeated at each time of recycle of dust, thereby causing the problem of deteriorating energy efficiency. Reduction of Zn contained in the dust is an endothermic reaction, and is effected in a furnace, thereby consuming heat energy. On the other hand, oxidation of Zn is an exothermic reaction and is effected in an exhaust gas system, thereby uselessly discharging most of the heat energy of the exhaust gas.

Therefore, a method has been proposed in which dust is re-used after it is reduced in a process apart from the stainless steel producing process, and then returned to the stainless steel producing process.

(Prior Art 1)

Japanese Unexamined Patent Application Publication No. 56-93834 discloses a method in which a carbonaceous reducing agent is added to mill scales, dust and sludge, the resultant mixture is pelletized, and heated and reduced in a rotary hearth furnace to produce metal-containing pellets, and then the metal-containing pellets are melted by an electric arc furnace for producing pig iron to separate and recover valuable metals such as Fe, Ni, Cr, Mo, etc. The recovered valuable metals are contained in a molten metal, and the molten metal is poured into a mold of a continuous casting machine from the electric arc furnace to form metal lumps. This publication discloses an example (example III) in which metal lumps containing 2.95% by mass of carbon are added to an electric arc furnace for producing stainless steel.

(Prior Art 2)

Japanese Unexamined Patent Application Publication No. 9-209047 discloses a method of re-using a waste material of a stainless steel producing process, the method comprising a pelletization step of pelletizing a mixture of coke and a chromium-containing blend obtained by adding an appropriate amount of chromium ore to a chromium-containing waste material produced in the stainless steel producing process to produce pellets, a reduction step of heating, by a combustion gas, the pellets allowed to stand on a hearth of a rotary hearth furnace to produce chromium-containing iron pellets with minimizing breakdown and fine generation, a waste heat recovering step of recovering, as steam, sensible heat possessed by an exhaust gas of the reduction step, and a zinc-containing dust recovering step of separating and collecting zinc-containing dust produced in the reduction step and contained in the exhaust gas discharged from the waste heat recovering step to recover the zinc-containing dust. This publication also discloses an example in which chromium-containing iron pellets are melted in an electric furnace, and used as a part of raw materials for producing chromium-containing pig iron.

In the above-described prior arts 1 and 2, in heating the pellets in the rotary hearth furnace, Zn contained in the pellets is reduced with the carbonaceous reducing agent, and evaporated and removed from the pellets. Therefore, even if the pellets after reduction are supplied to the electric furnace, the dust is not enriched with Zn, thereby preventing the problem of coating in an exhaust gas system.

However, in the above-described prior arts 1 and 2, the pellets after reduction are charged into the electric melting furnace, and used for producing chromium-containing pig iron having a high carbon content. Therefore, the content of carbon remaining in the pellets (metal lumps or chromium-containing iron pellets) after reduction is relatively high. Namely, as described above, in the example of the prior art 1, the carbon content of the metal lumps is 2.95% by mass. In example 2 of the prior art 2, the carbon content of the chromium-containing iron pellets is not specified, but 4.7% by mass of carbon is present in 125 parts by mass of chromium-containing pig iron, and the pig iron is produced from 211 parts by mass of chromium-containing iron pellets. Therefore, the carbon content of the chromium-containing iron pellets, which is estimated in consideration of the carbon content consumed by chromium reduction in the electric furnace, is 2.8% by mass or more. The chromium-containing pig iron is decarbonized to a target carbon level in a next oxidation period, and then reduced and finish-refined to produce stainless steel. Since decarbonization is performed by blowing oxygen into molten steel, Cr is oxidized with the progress of decarbonization, and is transferred into slag. After decarbonization is completed, Fe—Si is added as a reducing agent in the reduction period to reduce a Cr oxide to return the oxide to metal Cr, thereby recovering Cr in the molten steel.

However, Cr contained in the chromium-containing iron pellets is not sufficiently reduced by heating in the rotary hearth furnace (generally, a Cr metallization degree is about 40% or less), and most of Cr remains in an oxide form. The unreduced Cr oxide is metallized by reduction with carbon remaining in the pellets and carbon contained in the molten steel in the electric furnace in the melting period, and recovered in the molten steel. However, a part of the Cr oxide remains in the slag and is discarded together with the slag (electric furnace slag). Cr recovered in the molten steel is partially oxidized in a subsequent oxidation period (or pre-decarbonization period), and transferred into the slag. The Cr in the slag is again reduced in a subsequent reduction period and recovered in the molten steel, but a part of Cr remains in the slag, and is discarded together with the slag (refining furnace slag). In this way, the unreduced Cr oxide contained in the chromium-containing iron pellets is reduced in the melting period, and then oxidized in the oxidation period (or pre-decarbonization period), and further reduced in the reduction period. Therefore, an endothermic reduction reaction requires excess reduction energy, thereby causing an energy loss. Also, Cr remains in both the electric furnace slag and the refining furnace slag, thereby causing the problem of a low yield of Cr recovered to the molten steel.

SUMMARY OF THE INVENTION

Accordingly, it is an object of the present invention to provide a method of producing stainless steel capable of decreasing the energy required for reducing Cr, and increasing a Cr yield of molten steel when a waste material such as dust produced in a stainless steel producing process is re-used.

According to the present invention, a method of producing stainless steel comprises a stainless steel producing step of melting a raw material to form molten steel, and then refining the molten steel to produce stainless steel, a reducing agent adding step of adding a carbonaceous reducing agent to a zinc-containing waste material produced in the stainless steel producing step to form a mixture, a heat treatment step of heating the mixture to evaporate and remove zinc and form a dezincified mixture, and a charging step of charging the dezincified mixture as a coolant into a furnace in the stainless steel producing step.

The method of producing stainless steel further comprises a step of agglomerating the mixture to form agglomerates incorporated with a carbonaceous material.

In the method of producing stainless steel, the agglomerates incorporated with the carbonaceous material are heated in the heat treatment step to evaporate and remove zinc, to form dezincified agglomerates, and the charging step comprises charging the dezincified agglomerates as a coolant into the furnace in the stainless steel producing step.

In the method of producing stainless steel, the amount of surplus carbon in the mixture is controlled by controlling the amount of the carbonaceous reducing agent added so that the amount of residual carbon in the dezincified mixture is 2% by mass or less.

In the method of producing stainless steel, the amount of surplus carbon in the agglomerates incorporated with the carbonaceous material is controlled by controlling the amount of the carbonaceous reducing agent added so that the amount of residual carbon in the dezincified agglomerates is 2% by mass or less.

The method of producing stainless steel further comprises a dezincification agglomeration step of agglomerating the dezincified mixture to form dezincified agglomerates.

In the method of producing stainless steel, the charging step comprises charging the dezincified agglomerates as a coolant into the furnace in the stainless steel producing step.

In the method of producing stainless steel, the amount of surplus carbon in the mixture is controlled by controlling the amount of the carbonaceous reducing agent added so that the amount of residual carbon in the dezincified agglomerates is 2% by mass or less.

In the method of producing stainless steel, the molten steel is agitated after the dezincified mixture is charged.

In the method of producing stainless steel, the molten steel is agitated after the dezincified agglomerates are charged.

In the method of producing stainless steel, the dezincified mixture is charged as the coolant into the furnace in an oxidation period or/and reduction period in the stainless steel producing step.

In the method of producing stainless steel, the dezincified agglomerates are charged as the coolant into the furnace in the oxidation period or/and reduction period in the stainless steel producing step.

In the method of producing stainless steel, the dezincified mixture is charged-as the coolant into the furnace in a last stage of the oxidation period or/and an initial stage of the reduction period in the stainless steel producing step.

In the method of producing stainless steel, the dezincified agglomerates are charged as the coolant into the furnace in the last stage of the oxidation period or/and the initial stage of the reduction period in the stainless steel producing step.

In the present invention, a carbonaceous reducing agent is added to a zinc-containing waste material produced in the stainless steel producing step to form agglomerates incorporated with a carbonaceous material, and the agglomerates incorporated with the carbonaceous material are heated to evaporate and remove zinc, producing dezincified agglomerates having a residual carbon content of 2% by mass or less.

In the present invention, a carbonaceous reducing agent is added to a zinc-containing waste material produced in the stainless steel producing step to form a mixture, the mixture is heated to evaporate and remove zinc, producing a dezincified mixture, and then the dezincified mixture is agglomerated to produce dezincified agglomerates having a residual carbon content of 2% by mass or less.

BRIEF DESCRIPTION OF THE DRAWING

FIG. 1 is an equipment flowchart illustrating an example of a stainless steel producing process according to an embodiment of the present invention.

DESCRIPTION OF THE PREFERRED EMBODIMENTS

The present invention will be described in detail below.

An embodiment of the present invention will be described in further detail below with reference to the drawing.

In the embodiment of the present invention, an example of a stainless steel producing process 1 is described, in which an electric furnace 11 for melting raw materials (main raw material E and fluxing agent F) to form molten steel G, and an AOD (Argon Oxygen Decarbonization) furnace 12 serving as a refining furnace for refining the molten steel G are provided, as shown in FIG. 1.

A zinc-containing waste material A such as an electric furnace dust generated from the stainless steel producing process 1 is mixed with a carbonaceous reducing agent B such as coal (reducing agent adding step), and the resultant mixture is agglomerated by an agglomeration machine 2 such as a briquette press or the like (carbonaceous material adding and agglomeration step). Besides the electric furnace dust, mill scales, mill sludge, AOD dust or other refining furnace dust, or an appropriate mixture thereof may be used as the zinc-containing waste material A. Besides coal, coke fines, charcoal, waste toner, or other carbides, or an appropriate mixture thereof may be used as the carbonaceous reducing agent B. Also, a secondary raw material and binder may be added according to demand. Besides a compression molding machine such as the briquette press, a tumbling granulator, an extrusion molding machine, or the like may be used as the agglomeration machine 2.

The resultant agglomerates C incorporated with the carbonaceous material are charged into a rotary hearth furnace 3 serving as a reducing furnace. As the reducing furnace 3, a multiple hearth furnace, a rotary kiln, or the like, as well as the rotary hearth furnace, may be used. When the agglomerates C incorporated with the carbonaceous material have a high moisture content, the agglomerates C may be dried with a dryer not shown in the drawing before they are charged into the reducing furnace 3.

The agglomerates C incorporated with the carbonaceous material are heated to 1100 to 1400° C. in the reducing furnace 3 to evaporate and remove heavy metals such as Zn, Pb, and the like by reduction. At the same time, metal compounds of Fe, Ni, Cr, Mo, and the like are reduced in a solid state, and metallized to obtain dezincified agglomerates D (heat treatment step). However, the metallization degree of Cr is not so high, and even when the amount of the carbonaceous reducing agent B added to the agglomerates C incorporated with the carbonaceous material, and the heating temperature in the reducing furnace 3 are appropriately controlled, the metallization degree is about 40%. On the other hand, the metallization degrees of Fe and Ni can be increased to 90% or more by controlling the amount of the carbonaceous reducing agent B added to the agglomerates C incorporated with the carbonaceous material, and the heating temperature in the reducing furnace 3.

In the stainless steel producing process 1, the main raw material E comprising scraps, Fe—Cr, Fe—Ni, and Ni metal, and the fluxing agent F such as calcined lime are charged into the electric furnace 11, and the resultant mixture is melted by arc heating to produce the molten steel G. When the AOD furnace 12 is used in the subsequent step, the electric furnace 11 is charged only with the melting period of simply melting the raw materials. Next, the molten steel G is transferred to the AOD furnace 12 to refine the molten steel G. The AOD furnace 12 is charged with the oxidation period in which Ar and oxygen are blown into the molten steel G to decarbonize the molten steel G, the reduction period in which the molten steel G is agitated by blowing only Ar to metallize Cr, which is oxidized in the oxidation period and transferred into slag, by reduction with C contained in the molten steel G, and to recover Cr into the molten steel G, and the finish refining period in which a deoxidizing agent (reducing agent) such as Fe—Si and alloy elements are added to the molten steel G, and the molten steel G is agitated by blowing only Ar to deoxidize the molten steel G, and to control the components and temperature of the molten steel G. The molten steel G is refined by the AOD furnace 12 to produce stainless steel H which is then transferred to a next casting step 4.

The dezincified agglomerates D obtained by the rotary hearth furnace 3 are charged in the oxidation period and/or reduction period of the AOD furnace 12 (charging step). Since zinc is sufficiently removed from the dezincified agglomerates D before the dezincified agglomerates D are charged into the AOD furnace 12, Zn is not concentrated in dust, thereby causing no problem of coating in the exhaust gas system, unlike in the prior arts 1 and 2.

Furthermore, since the dezincified agglomerates D are charged directly in the oxidation period and/or reduction period of the AOD furnace 12, not in the melting period of the electric furnace 11, Cr derived from the dezincified agglomerates D does not remain in the electric furnace slag, thereby causing the effect of increasing the Cr yield as compared with the prior arts 1 and 2. In addition, a useless path in which a Cr oxide contained in the dezincified agglomerates D is reduced and then again oxidized is omitted, to eliminate the need for excess reduction energy, thereby causing the effect of improving energy efficiency.

The dezincified agglomerates D are more preferably charged in a last stage of the oxidation period (near the time when oxygen blowing for decarbonization is finished) and/or an initial stage of the reduction period (near the time when the deoxidizing agent is added) because re-oxidation of Cr can be further prevented.

Furthermore, the amount of the carbonaceous reducing agent B (i.e., the amount of surplus carbon) in the agglomerates C incorporated with the carbonaceous material is preferably decreased to a level which does not cause an excessive decrease in the dezincification degree of the agglomerates (dezincified agglomerates) D after heating in the rotary hearth furnace 3. This is because with the large amount of the carbonaceous reducing agent B contained in the agglomerates C incorporated with the carbonaceous material, the amount of residual carbon in the dezincified agglomerates D is increased. Therefore, when the dezincified agglomerates D are used as the coolant in the oxidation period of the AOD furnace 12, the amount of oxygen used for decarbonization is increased, and the oxidation period is extended to deteriorate productivity. The possible reason why the oxidation period is extended is that with the molten steel having a low carbon content (for example, 0.4% by mass or less), a rate-determining process of decarbonization reaction is thought to be a process of diffusing C in the molten steel, and carbon in the dezincified agglomerates D slowly diffuses into the molten steel as compared with C contained in the molten steel. Also, when carbon diffuses into the molten steel, the carbon content of the dezincified agglomerates D is higher than that in the surrounding molten steel, thereby decreasing the diffusion rate.

In this way, when the amount of the carbonaceous reducing agent B in the agglomerates C incorporated with the carbonaceous material is limited, the metallization degree of iron in the dezincified agglomerates D is decreased, but the effect of the coolant is increased due to an increase in the amount of iron oxide in the dezincified agglomerates D. In this case, the cooling effect is increased to about two times as high as the cooling effect of ordinary scraps. Furthermore, as the amount of residual carbon decreases, strength of the dezincified agglomerates D increases to decrease the fine generation at the time of transport and storage, or charging into the refining furnace, thereby improving the yield.

Although the dezincified agglomerates D charged as the coolant in the oxidation period of the AOD furnace 12 are dissolved in the molten steel, unreduced Cr contained in the dezincified agglomerates D can be efficiently recovered by charging a reducing agent such as Fe-Si and strongly agitating with Ar gas in the reduction period in the subsequent step.

Besides the AOD furnace, a VOD (Vacuum Oxygen Decarbonization) furnace, a MRP (Metal Refining Process) furnace, or the like can be used as the refining furnace 12. When a VOD furnace is used as the refining furnace 12, the oxidation period (pre-decarbonization period) and the reduction period are provided after the melting period in the electric furnace 11 so that the VOD furnace is charged only with the finish refining period. Therefore, the dezincified agglomerates D are charged as the coolant in the oxidation period (pre-decarbonization period) and/or reduction period in the electric furnace 11. In this case, unreduced Cr in the dezincified agglomerates is reduced and recovered into the molten steel in the reduction period of the next step in the electric furnace 11, and then the molten steel is transferred to the VOD furnace. In the finish refining period of the VOD furnace, the amount of the coolant used is small in order to suppress Cr oxidation, and the Cr yield is lower than that in the AOD furnace. Therefore, in the use of the VOD furnace, the effect of the present invention is smaller than that in the use of the AOD furnace.

The method described in this embodiment comprises agglomerating a mixture of the zinc-containing waste material A and the carbonaceous reducing agent B, and then heat-treating the agglomerates in the reducing furnace 3 to obtain the dezincified agglomerates D. However, the mixture of the zinc-containing waste material A and the carbonaceous reducing agent B may be charged into the reducing furnace 3 without agglomeration, and then heat-treated in the reducing furnace 3. Also, the dezincified mixture obtained by heat treatment may be charged as the coolant. Furthermore, the dezincified mixture after heat treatment may be agglomerated to form the dezincified agglomerates D (dezincification agglomeration step). The dezincified agglomerates may be charged as the coolant.

The dezincified agglomerates D and/or dezincified mixture can be used as the coolant in the oxidation period (or the pre-decarbonization period) and/or the reduction period, and also used as the main raw material and/or additional raw material of the electric furnace 11 and the refining furnace 12.

EXAMPLES

Example 1

Coal was added to a mixture of electric furnace dust generated from the stainless steel producing process and mill scales, and the resultant mixture was agglomerated into pillow-shaped agglomerates of 21 mm×37 mm×9 mm by a briquette press, to produce agglomerates incorporated with a carbonaceous material having the composition shown in Table 1.

TABLE 1

| | | | | | (% by mass) | |
|---|---|---|---|---|---|---|
| Agglomerates incorporated with carbonaceous material | T.Fe 37.28 T.Ni 4.048 | M.Fe 4.78 M.Ni 0.96 | FeO 20.21 T.Cr 1.948 | C 8.48 M.Cr 0.35 | Zn 2.128 | Amount of surplus carbon −1.26 |

The amount of surplus carbon is defined as follows:

Amount of surplus carbon (% by mass)=[amount (% by mass) of carbon in the agglomerates incorporated with the carbonaceous material]−[amount (% by mass) of oxygen combined with Fe, Ni and Zn contained in the agglomerates incorporated with the carbonaceous material]×12/16

When the mixture is used without agglomeration, the amount of surplus carbon is defined as follows:

Amount of surplus carbon (% by mass)=[amount (% by mass) of carbon in the mixture]−[amount (% by mass) of oxygen combined with Fe, Ni and Zn contained in the mixture]×12/16

The agglomerates incorporated with the carbonaceous material were heated in a small heating furnace at various temperatures in the range of 1150° C. to 1350° C., and the compositions of the agglomerates (dezincified agglomerates) incorporated with the carbonaceous material after heating were measured by chemical analysis to determine the metallization degree of each metal and the dezincification degree. The heating atmosphere was a nitrogen atmosphere, and the heating time was 5 to 8 minutes. Table 2 shows the compositions of the agglomerates (dezincified agglomerates) incorporated with the carbonaceous material after heating, and Table 3 shows the metallization degree and the dezincification degree.

TABLE 2

| Test No. | Heating temperature (° C.) | Composition (% by mass) | | | | | | |
|---|---|---|---|---|---|---|---|---|
| | | T.Fe | M.Fe | C | T.Ni | M.Ni | T.Cr | M.Cr | Zn |
| SM-1 | 1150 | 50.21 | 28.77 | 2.24 | 6.524 | 6.48 | 2.173 | 0.26 | 1.099 |
| SM-2 | 1200 | 52.65 | 29.51 | 1.90 | 6.467 | 6.42 | 2.133 | 0.20 | 0.563 |
| SM-3 | 1250 | 49.94 | 31.89 | 1.64 | 7.416 | 7.21 | 2.264 | 0.17 | 0.427 |
| SM-4 | 1300 | 52.95 | 31.71 | 1.55 | 6.628 | 6.60 | 2.198 | 0.18 | 0.470 |
| SM-5 | 1350 | 52.34 | 31.26 | 0.58 | 6.530 | 6.53 | 3.010 | 0.07 | 0.212 |

TABLE 3

| Test No. | Metallization degree (%) | | | Dezincification degree (%) | Crush strength (kg/B) |
|---|---|---|---|---|---|
| | Fe | Ni | Cr | | |
| SM-1 | 57.30 | 99.33 | 11.97 | 61.65 | 67 |
| SM-2 | 56.05 | 99.27 | 9.38 | 81.27 | 71 |
| SM-3 | 63.86 | 97.22 | 7.51 | 85.02 | 100 |
| SM-4 | 59.89 | 99.58 | 8.19 | 84.45 | 121 |
| SM-5 | 59.72 | 100.00 | 2.33 | 92.90 | 160 |

Tables 2 and 3 indicate that the amount of residual carbon and the dezincification degree of the dezincified agglomerates vary with the heating temperature. At a heating temperature of 1200° C. or more, the dezincification degree is desirably 80% or more. It is also found that the amount of residual carbon decreases as the heating temperature increases. The amount of residual carbon is preferably smaller than an amount necessary for reducing iron oxide, nickel oxide and chromium oxide remaining in the dezincified agglomerates. With a carbon residue content exceeding the necessary amount, excess oxygen is required for removing (decarbonizing) carbon from the molten steel in the stainless steel producing process.

In this example, stainless steel was produced in the producing process comprising an electric furnace and AOD furnace by using the dezincified agglomerates of SM-4, and the behavior of Cr contained in the dezincified agglomerates was measured with reference to operation data such as a Cr yield of an actual machine. As a result of the measurement, assuming that the Cr yield (the ratio of Cr remaining in stainless steel to Cr contained in the dezincified agglomerates) of the dezincified agglomerates used as part of a raw material in an electric furnace is 100, the Cr yield of the dezincified agglomerates used as a coolant in a final stage of the oxidation period of the AOD furnace is 105, and thus the Cr yield is improved. Also, assuming that the energy necessary for reducing Cr, which is contained in the dezincified agglomerates used as part of the raw material in the electric furnace and which remains in stainless steel, is 100, the reduction energy of the agglomerates used as the coolant in the oxidation period of the AOD furnace is 95, and the energy consumption is decreased. This is because when the dezincified agglomerates are charged as a part of the raw material into the electric furnace, a part of chromium reduced in the electric furnace is again oxidized in the oxidation period of the AOD furnace, and thus re-reduction is required after the oxidation period. On the other hand, when the agglomerates are used as the coolant in the oxidation period (and/or the reduction period) of the AOD furnace, reduction in the electric furnace is not required.

Example 2

Next, a relationship between the amount of surplus carbon in agglomerates incorporated with a carbonaceous material and the amount of residual carbon in the agglomerates (dezincified agglomerates) incorporated with the carbonaceous material after heat treatment was examined. The amount of coal added to the agglomerates incorporated with the carbonaceous material was changed to produce three types of samples having different amounts of surplus carbon, as shown in Table 4.

TABLE 4

| Test No. | T.Fe | M.Fe | FeO | C | T.Cr | M.Cr | Zn | (% by mass) Amount of surplus carbon |
|---|---|---|---|---|---|---|---|---|
| SD-1 | 27.63 | 1.20 | 3.18 | 11.75 | 0.436 | 0.08 | 16.53 | 0.47 |
| SD-2 | 27.13 | 1.83 | 3.57 | 11.58 | 0.490 | 0.07 | 21.81 | −0.27 |
| SD-3 | 27.46 | 1.63 | 5.96 | 10.09 | 0.445 | 0.06 | 17.09 | −0.85 |

Each of the samples was heat-treated at 1300° C. (constant) in the same small heating furnace as that used in Example 1 in the same atmosphere for the same heating time as in Example 1. Table 5 shows the composition of each sample (dezincified agglomerates) after heating, and Table 6 shows the metallization degree of each metal element, and the dezincification degree.

TABLE 5

| Test | (% by mass) | | | | | |
|---|---|---|---|---|---|---|
| No. | T.Fe | M.Fe | C | T.Cr | M.Cr | Zn |
| SD-1 | 46.60 | 42.22 | 2.35 | 0.810 | 0.31 | 0.179 |
| SD-2 | 48.76 | 43.93 | 1.78 | 0.899 | 0.09 | 0.463 |
| SD-3 | 47.33 | 40.86 | 0.98 | 0.806 | 0.09 | 0.261 |

TABLE 6

| Test | Metallization degree (%) | | Dezincification |
|---|---|---|---|
| No. | Fe | Cr | degree (%) |
| SD-1 | 90.60 | 38.27 | 99.36 |
| SD-2 | 90.09 | 10.01 | 98.82 |
| SD-3 | 86.33 | 11.17 | 99.11 |

As described above, the amount of residual carbon in the agglomerates incorporated with the carbonaceous material is preferably smaller than a necessary amount for reducing an unreduced metal oxide. However, the analysis results shown in Table 5 indicate that an appropriate amount of residual carbon can be selected. Table 4 and 5 indicate that the amount of residual carbon in the agglomerates (dezincified agglomerates) incorporated with the carbonaceous material after heating can be controlled by controlling the amount of surplus carbon in the agglomerates incorporated with the carbonaceous material. However, the reduction ability of a metal oxide and the form of present carbon vary with the generation source of a zinc-containing waste material used as a raw material of the agglomerates incorporated with the carbonaceous material and the type of the carbonaceous reducing agent added. Therefore, an appropriate numerical range of the amount of surplus carbon varies with the types of the zinc-containing waste material and the carbonaceous reducing agent, and a combination thereof. Also, as be seen from Example 1, the amount of residual carbon in the dezincified agglomerates varies with the heating temperature. Therefore, in consideration of these points, for example, the same test as in Examples 1 and 2 must be previously performed by using each of combinations and types of the zinc-containing waste material and carbonaceous reducing agent to determine an appropriate numerical range of the amount of surplus carbon.

The present invention having the above-described construction can provide the method of producing stainless steel capable of decreasing Cr reduction energy and increasing a Cr yield of molten steel when a waste material such as dust produced in the stainless steel producing process is re-used.

What is claimed is:

1. A method of producing stainless steel comprising:
    a stainless steel producing step of melting a raw material to form molten steel in a melting furnace, and then refining the molten steel to produce stainless steel in a refining furnace;
    a reducing agent adding step of adding a carbonaceous reducing agent to a zinc-containing waste material produced in the stainless steel producing step to form a mixture;
    a heat treatment step of heating the mixture to evaporate and remove zinc and form a dezincified mixture; and
    a charging step of charging, the dezincified mixture as a coolant into the refining furnace, and optionally the melting furnace, in the stainless steel producing steps,
    wherein the amount of surplus carbon in the mixture is controlled by controlling the amount of the carbonaceous reducing agent added so that the amount of residual carbon in the dezincified mixture is 2% by mass or less.

2. The method of producing stainless steel according to claim 1, further comprising an agglomeration step of agglomerating the mixture to form agglomerates incorporated with a carbonaceous material.

3. The method of producing stainless steel according to claim 2, wherein the agglomerates incorporated with the carbonaceous material are heated in the heat treatment step to evaporate and remove zinc and form dezincified agglomerates, and the charging step comprises charging the dezincified agglomerates as a coolant into the refining furnace, and optionally the melting furnace, in the stainless steel producing step.

4. The method of producing stainless steel according to claim 1, further comprising a dezincification agglomeration step of agglomerating the dezincified mixture to form dezincified agglomerates.

5. The method of producing stainless steel according to claim 4, wherein the charging step comprises charging the dezincified agglomerates as a coolant into the refining furnace, and optionally the melting furnace, in the stainless steel producing step.

6. The method of producing stainless steel according to claim 1, wherein the molten steel is agitated after the dezincified mixture is charged.

7. The method of producing stainless steel according to claim 3, wherein the molten steel is agitated after the dezincified agglomerates are charged.

8. The method of producing stainless steel according to claim 5, wherein the molten steel is agitated after the dezincified agglomerates are charged.

9. The method of producing stainless steel according to claim 1, wherein the dezincified mixture is charged as the coolant into the refining furnace in an oxidation period or/and reduction period in the stainless steel producing step.

10. The method of producing stainless steel according to claim 9, wherein the dezincified mixture is charged as the coolant into the refining furnace in a final stage of the oxidation period or/and an initial stage of the reduction period in the stainless steel producing step.

* * * * *

UNITED STATES PATENT AND TRADEMARK OFFICE
CERTIFICATE OF CORRECTION

| | | |
|---|---|---|
| PATENT NO. | : 7,175,691 B2 | Page 1 of 1 |
| APPLICATION NO. | : 10/438013 | |
| DATED | : February 13, 2007 | |
| INVENTOR(S) | : Sugitatsu et al. | |

It is certified that error appears in the above-identified patent and that said Letters Patent is hereby corrected as shown below:

On the title page, Item (73), the Assignee Information is incorrect. Item (73) should read:

-- (73)   Assignee:  **Kabushiki Kaisha Kobe Seiko Sho
              (Kobe Steel, Ltd.)** Kobe (JP) --

Signed and Sealed this

Seventeenth Day of April, 2007

JON W. DUDAS
*Director of the United States Patent and Trademark Office*